Patented Oct. 30, 1945

2,388,122

UNITED STATES PATENT OFFICE 2,388,122

PROCESSES OF TREATING ORGANIC COMPOUNDS TO PRODUCE DRYING PRODUCTS

Ivor M. Colbeth, Maplewood, N. J.

No Drawing. Application June 10, 1942,
Serial No. 446,476

2 Claims. (Cl. 260—405.5)

This invention relates to the treatment of higher or long chain unsaturated organic compounds such as fatty acid esters, for example, having at least two double bonds in each molecule, in such a way that unsaturated products result therefrom that have a higher degree of conjugated unsaturation than the products from which they were made. The alcohol radical of these esters is not limited, as it may be a mono-, di-, tri-, tetra-, or higher alcohol, or mixture of two or more of them. Such products are particularly useful in the preparation of resins, varnishes and other drying products, as they form films which solidify by the process of oxidation or polymerization or oxidation and polymerization. This is a continuation-in-part of my applications Serial Nos. 209,980, filed May 25, 1938, now Patent No. 2,317,361 and 434,093, filed March 10, 1942.

The products formed by the present process have drying properties and are usually in the liquid state. They may be thin and mobile, or viscous and tacky, and in extreme cases they may be solid, depending upon the extent to which the process has been carried and the raw materials that were used in preparing them. They are soluble in the usual organic solvents that are commonly used in the paint industry, such as turpentine, naphtha, ethyl alcohol, ethyl acetate, and butyl alcohol, for example. They may be used for replacing other materials such as linseed oil, China-wood oil, dehydroxylated castor oil, and drying oils prepared from soya bean oil and fish oils, and other drying oils as well as bodied oil prepared from such oils.

The products made in accordance with this invention have specially rapid drying properties when compared to the original substances from which they were obtained. In this way certain desirable properties are imparted to the film after it has dried, such as water resistance, alkali resistance, and general toughness.

They combine with oxygen to yield solids, and when heated in the presence of polymerization catalysts they may be bodied to any degree of viscosity, even up to the point where they become solids. The polymerization occurs even without the use of catalysts when heat is applied, although the rate of polymerization is considerably slower.

In carrying out this invention, fatty oils may be used as the starting materials, or they may be modified in a variety of ways either at the beginning or farther along in the process. For example, the acid portion thereof may be combined with mono-, di-, tri-, tetra-, or other higher alcohols. The rapidity with which the products may be polymerized increases in proportion to the complexity of the alcohols. Pentaerythritol is a tetra hydroxy alcohol that is particularly useful in preparing an ester that can be very rapidly bodied. Other higher alcohols that are particularly suitable are mannitol and sorbitol. If the alcohol radical of the ester is itself unsaturated, such as vinyl alcohol, the product has even increased drying properties. This invention will cause an increase in the conjugation of double bonds therein. It is not necessary to start with oils that already contain high percentages of conjugated double bonds such as tung oil or oiticica oil.

In carrying out the invention the oil selected for treatment is first oxidized so as to form one or more oxygen, peroxide or hydroxy groups, or mixtures of them. The oxidized product is then treated in such a way as to dehydroxylate the oil, thus removing the oxygen as well as hydrogen. This may be done by the use of mineral acids or other suitable dehydroxylating agents. It has been found that alkaline dehydroxylating agents are even more effective than acid dehydroxylating agents. Borax, for example, is one of the agents that can be used to great advantage.

The following is given as an example illustrating the invention but it is to be understood that the invention is not restricted to this particular example.

Linseed oil is refined, preferably by means of an alkali, in any suitable manner, to remove lecithin and other anti-oxygen substances. The refined oil is then oxidized at temperatures in the neighborhood of 212° F. by blowing it with air, oxygen, or ozonized air, until a sufficient quantity of oxygen has been absorbed or chemically combined with the oil. This degree of oxidation can be determined by a study of the iodine value. In this example linseed oil having an initial iodine value of 176 is oxidized until the iodine value has been lowered to about 130. The oxidized oil so prepared is then heated to a temperature of approximately 500° F. The rate at which the heating is applied depends upon the ability of the apparatus to take care of the large evolution of gas that takes place. A vacuum of approximately 28 inches is maintained in the vessel, but the degree of vacuum is not critical. In general, the higher the vacuum at the start of the reaction the more vigorous the evolution of the gases. For this reason it is usually desirable to commence the process with a poorer vacuum and gradually increase it as the reaction progresses.

After the temperature has reached 500° F., a dehydroxylating catalyst dissolved in water or other volatile solvent is introduced into the reaction vessel. The percentage to be used depends upon that which is found to be most convenient. For example, an aqueous sodium acid sulphate solution made up to about 20% strength by weight of the solution is found to be convenient. An amount of this solution is added to bring the total active catalyst used up to about 0.5 to about 3%. As the reaction progresses, the viscosity and refractive index rise very sharply. A convenient end point for the reaction has been found to be a viscosity of P (Gardner Holdt) or refractive index of 1.4900. When the reaction is carried further higher viscosities result with higher refractive indices. The iodine value rises first to approximately 160, but as the reaction progresses it then decreases to about 120. The oil so prepared will dry in about one-third of the time that a similar untreated oil, but with like viscosity, will dry. Moreover, the drying is accompanied by a very pronounced wrinkling, which is one of the indications of a conjugated double bond system.

Linseed oil has been selected as an example to illustrate the process, but other oils may be used in the same way. If the oil to be used does not contain a sufficient number of double bonds, it is necessary first to treat the oil so it will contain at least two double bonds in the acid group. In my prior patent application Serial No. 434,093 and Patents Nos. 2,278,425, 2,278,426 and 2,278,427, were described processes to form drying oils utilizing boron compounds. While it is explained in those patents and that application how drying oils may be obtained, the present application sets forth the particular method of controlling the conjugations. By this invention conjugated double bonds can be gotten into oils containing no double bond or only one double bond or more than one double bond that are unconjugated. The value of the invention is in getting conjugated double bonds rather than merely getting double bonds.

I have found that it is particularly useful to introduce a solution of the catalyst into the oil. This has been found to be extremely valuable as a means for the carrying on of dehydroxylation, as the active ingredient is introduced into the oil in almost molecular condition in the solution or as a dispersion of minute microscopic crystals throughout the mass of the oil after the solvent has evaporated, thus enormously increasing the contact area between the catalyst and the oil. For example, without the use of a solution, sodium acid sulphate required six hours to dehydroxylate castor oil, but a like amount of sodium acid sulphate dissolved in water and added continuously during the run required only twenty minutes. Practically all available solutions of soluble catalysts and suspensions of insoluble catalysts for dehydration have been tried and have been found to be uniformly superior to undispersed solid catalysts or concentrated catalysts such as sulphuric acid.

By varying the amount of oxidation that is carried on prior to the dehydroxylation step, variations in the final product are obtained. The final polymerization step is also a matter of choice, depending upon the type of product that is to be made with the oil. For example, if the oil is to be used in varnishes together with non-reactive resins, such as ester gum, then the final processed oil should be of high viscosity. In contrast to this, when reactive resins are used, such as maleic and phenolic resins, then it is more desirable to use a product with a low viscosity.

The temperatures for carrying out the oxidation should be high enough, say 212° F., to complete the oxidation in a reasonable length of time, say 6 to 12 hours, and yet not so high as to cause decomposition of the oxygen products and undue polymerization of the oil. The temperature at which the dehydroxylation should be carried out should be preferably below the decomposition point of the oil and high enough to effect dehydroxylation, but this is not at all critical for the following reason. When a continuous process is used, the time of contact may be shortened so that equivalent results are obtained at higher temperatures than would be possible when a batch procedure is used. While the process of causing conjugated double bonds to be formed is one that usually requires difficult manipulation involving prolonged boiling with alkalis, and saponification of the fat and final re-esterification of the fatty acids to re-synthesize the glyceride has been recommended, the present process makes possible the direct formation of conjugated double bonds without necessitating laborious complicated chemical reactions. In this way the application of this method is made possible in practically any oil factory utilizing any of the ordinary accessible machinery and using any easily available fatty oil.

The products formed in accordance with this invention, when the alcohol radical is glycerol or pentaerythritol, are excellent starting materials for elastomers. The elastomer may be formed by reacting the products with sulphur or sulphur chloride and they may be further vulcanized, similar to rubber, by the use of accelerating agents such as captex or tuads, for example, with or without the addition of zinc oxide, gas black, etc. Also, due to the presence of the conjugated bonds, these products can be readily reacted with maleic anhydride and many of its derivatives to form valuable products for use in emulsions or for the preparation of thickened oils.

The products formed by the process above described, when studied by means of spectographic analyses, show clearly that there has resulted a shift in the double bond of the oils that were treated to a conjugated position.

In carrying out the present invention I may, for example, start with the products of my prior Patents Nos. 2,278,425; 2,278,426; and 2,278,427.

What is claimed is:

1. The process which comprises oxidizing an aliphatic ester having a long chain acid radical and containing at least two unconjugated double bonds until its iodine value has been appreciably lowered, and dehydroxylating the oxidized product in the presence of a dehydroxylating agent dissolved in water.

2. The process which comprises oxidizing an aliphatic ester having a long chain acid radical and containing at least two unconjugated double bonds until its iodine value has been appreciably lowered, and dehydroxylating the oxidized product in the presence of a dehydroxylating agent which is about a 20% aqueous solution of sodium acid sulphate.

IVOR M. COLBETH.